United States Patent
Makino et al.

(10) Patent No.: US 7,385,735 B2
(45) Date of Patent: Jun. 10, 2008

(54) SHEET TRANSPORT APPARATUS, IMAGE READING APPARATUS AND IMAGE FORMING APPARATUS

(75) Inventors: Yuichi Makino, Tokyo (JP); Taiya Hirayama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 845 days.

(21) Appl. No.: 10/494,724

(22) PCT Filed: Dec. 18, 2002

(86) PCT No.: PCT/JP02/13217

§ 371 (c)(1),
(2), (4) Date: May 6, 2004

(87) PCT Pub. No.: WO03/055199

PCT Pub. Date: Jul. 3, 2003

(65) Prior Publication Data

US 2004/0246540 A1    Dec. 9, 2004

(30) Foreign Application Priority Data

Dec. 21, 2001   (JP)   ............................. 2001-388845
Jan. 30, 2002   (JP)   ............................. 2002-021129

(51) Int. Cl.
*H04N 1/04*   (2006.01)
(52) U.S. Cl. .................. 358/496; 358/498; 358/475; 358/474
(58) Field of Classification Search ............... 358/496, 358/498, 474, 505, 501, 401, 296; 399/367, 399/397, 405; 271/3.14, 8.1
See application file for complete search history.

(56) References Cited

U.S. PATENT DOCUMENTS 4,812,917 A    3/1989   Suzuki .................. 358/293

(Continued)

FOREIGN PATENT DOCUMENTS

EP    0 511 004 A2   10/1992

(Continued)

OTHER PUBLICATIONS

PCT International Search Report mailed Report mailed Mar. 18, 2003 for PCT Application No. PCT/JP02/13217.
European Search Report in Application No. EP 41763 (Jun. 8, 2005).

*Primary Examiner*—Cheukfan Lee
(74) *Attorney, Agent, or Firm*—Fitzpatrick, Cella, Harper & Scinto

(57) ABSTRACT

An image reading apparatus including; a supply device for supplying sheets to a reading position, a platen glass plate in the reading position, a platen roller opposed to the platen glass plate, a reading device for exposing a sheet on the platen glass plate to read an image on the sheet, and a white guide member upstream of the platen roller in the transporting direction, wherein a portion of the guide member closest to the platen roller is on the platen roller side with respect to a plane which includes the point in the outer periphery of the platen roller closest to the platen glass plate and which is parallel to the platen glass plate, and wherein the longitudinal length of the guide member is the same as or larger than the width of the range of the reading device.

12 Claims, 12 Drawing Sheets

U.S. PATENT DOCUMENTS

| | | | |
|---|---|---|---|
| 5,661,571 A * | 8/1997 | Ijuin et al. | 358/471 |
| 6,166,394 A | 12/2000 | Rubscha | 250/559.42 |
| 6,809,796 B2 * | 10/2004 | Sugeta | 355/40 |
| 2001/0033761 A1 | 10/2001 | Takida et al. | 399/367 |
| 2003/0043410 A1 | 3/2003 | Fukawa et al. | 358/2.1 |
| 2003/0081268 A1 | 5/2003 | Hirayama | 358/474 |
| 2003/0214680 A1 * | 11/2003 | Sugeta et al. | 358/461 |
| 2004/0125412 A1 * | 7/2004 | Sugeta | 358/3.26 |
| 2004/0165277 A1 * | 8/2004 | Ng et al. | 359/642 |
| 2004/0207887 A1 * | 10/2004 | Makino et al. | 358/496 |
| 2004/0223192 A1 * | 11/2004 | Hiromatsu et al. | 358/474 |

FOREIGN PATENT DOCUMENTS

| | | |
|---|---|---|
| EP | 0 659 008 A2 | 6/1995 |
| JP | 3-136462 | 6/1991 |
| JP | 5-103165 | 4/1993 |
| JP | 05103165 A * | 4/1993 |
| JP | 5-82168 | 11/1993 |
| JP | 2001048374 | 2/2001 |

* cited by examiner

SHEET TRANSPORT APPARATUS, IMAGE READING APPARATUS AND IMAGE FORMING APPARATUS

TECHNICAL FIELD

The present invention relates to a sheet transport apparatus and an image reading apparatus having the sheet transport apparatus for use in a copying machine, a scanner, a facsimile apparatus, etc. in which a sheet is fed and transported when the image on the sheet is to be read.

BACKGROUND ART

Up to now, some image reading apparatuses provided in digital copying machines, printers, facsimile apparatuses and the like are equipped with an openable and closable original treatment apparatus which is an example of a sheet transport apparatus for automatically feeding an original in the form of a sheet or the like to the image reading apparatus. The image reading apparatus performs image reading with an exposure means on the original automatically fed by the original treatment apparatus.

As a conventional example of the exposure means, an image reading method (hereinafter referred to as flow reading) is known according to which an exposing device is fixed at a predetermined reading position on a platen glass plate provided in an image reading apparatus, the image being read by moving the original past the reading position at a predetermined speed. This flow reading is advantageous in that one original can be quickly replaced by another, and is applied to a variety of products.

However, in an original treatment apparatus utilizing the flow reading technique, in which the original is read while being transported, the original may be raised or flutter vertically during reading under the influence of the guide load or guide curvature. Thus, the original may be rather unstable.

As an example of the means for coping with this, a construction is available in which a platen roller is provided opposite to the platen glass plate in order to press the original against the platen glass plate.

FIG. 15 shows an example of a conventional image reading apparatus. The image reading apparatus shown in FIG. 15 is equipped with an original glass stand 300 for a reading system (hereinafter referred to as the book reading system) in which a stationary original placed thereon is read, a flow reading glass 301 for the flow reading system, and a reading sensor 302 consisting of a contact image sensor or the like which is an image reading means used for both reading systems.

In the flow reading system, a platen roller 304 arranged above the flow reading glass 301 at a predetermined distance therefrom is rotated at a predetermined speed, whereby at the time of flow reading, the original is transported in a stable manner while restricting the amount by which the original is raised from the upper surface of the flow reading glass 301.

The flow reading system using the platen roller 304 has a problem in that when there is a variation in the reading position, i.e., the stop position of the reading sensor 302, with respect to the platen roller, a variation in the brightness level of the read image is involved. FIG. 16 is a schematic view of a conventional image reading apparatus for explaining the cause of this phenomenon.

In FIG. 16, the route of light from an illuminating means 305 in the case of the book reading system is designated by the reference sign 16A, and the route of light from the illuminating means 305 in the case of the flow reading system is designated by the reference sign 16B. In FIG. 16, the route of light applied from the illuminating means on one side and transmitted through the original is schematically indicated by double-dotted lines. In the example shown, the reading position for the flow reading system is deviated from the position directly below the center of the platen roller 304 to the upstream side with respect to the original transporting direction.

In the case of the book reading system designated by the reference sign 16A in FIG. 16, the light transmitted through the original 306 is reflected in the direction of the reading sensor 302 by a white pressure plate 307 pressing the original 306 against the original glass stand 300, and illuminates the back surface of the original. In contrast, in the case of the flow reading system designated by the reference sign 16B in FIG. 16, a part of the light transmitted through the original 306 and reflected by the white platen roller 304 is reflected away from the reading sensor 302 due to the curvature of the platen roller 304.

As a result, the quantity of light illuminating the back surface of the original 306 is reduced, resulting in a reduction in brightness when the reflected light from the original is read by an image sensor 309 through a lens 308. As the reading position is shifted away from the position directly below the center of the platen roller 304, the quantity of light reflected in the direction of the reading sensor 302 decreases, resulting in a further reduction in the brightness of the image even when the same original is read. The higher the light transmittance of the original 306, the greater the influence of this phenomenon. Thus, the thinner the original 306, the more conspicuous is the reduction in brightness.

To perform image reading without being influenced by this reduction in brightness, it is necessary to accurately place the reading sensor 302 at the position directly below the rotation center of the platen roller 304, in which it is possible to obtain substantially the same brightness as in the case of the book reading system.

However, due to the accuracy in the stop position of the reading sensor 302, play or slop, etc. in the hinge portion of the ADF 303 mounted so as to allow opening and closing, it is difficult to perform accurate positioning on the reading sensor 302 with respect to the platen roller 304.

Further, the portion of the surface of the flow reading glass 301 directly below the center of the platen roller 304 and the portion thereof on the downstream side in the original transporting direction are subject to adhesion of dirt. When dirt exists at the reading position, the image will be streaked. In view of this, it is desirable for the reading position to be set somewhat upstream with respect to the position directly below the center of the platen roller 304.

To prevent generation of a streaked image due to dirt on the flow reading glass 301, there has been proposed a method according to which image reading is performed at the reading position for flow reading while rotating the platen roller 304, with the original not being transported, to thereby distinguish between dirt on the flow reading glass 301 and dirt on the surface of the platen roller 304. When dirt is detected on the flow reading glass 301, the reading position is shifted. In the case in which this operation for preventing generation of a streaked image is performed, the reading position for flow reading is inevitably moved.

As described above, due to the influence of the component accuracy and the operation for preventing generation of a streaked image, it is difficult for the reading position for flow reading to remain the same always with respect to the platen roller 304. Thus, a variation in brightness as mentioned above is involved.

FIG. 17 shows another example of the construction of the portion of an original treatment apparatus using a platen roller which is in the vicinity of the reading position. In the vicinity of the reading position of this conventional apparatus using a platen roller, there are provided transport roller pairs 402 and 403 situated on the upstream and downstream sides of the reading position 401 and adapted to transport the original at a predetermined speed, and a platen roller 405 situated substantially above the reading position and rotatable by a driving means (not shown).

An exposure device 409 is provided below a platen glass plate 404 to perform image reading operation on an original transported at a uniform velocity between the platen roller 405 and the platen glass plate 404. To stabilize the quantity of light on the exposure device 409 during reading to thereby prevent show-through, and to realize contrast enhancement on the characters and background when reading an original likely to be see-through as in the case of a thin sheet or an intermediate paper, the color of the platen roller 405 is white. Thus, the range in which reading by the exposure device 409 is possible must be a range in which the whiteness of the platen roller 405 is suited for reading. In view of this, the exposure device is usually provided directly below the platen roller.

Further, the platen roller 405 is supported by an oscillation arm 406 so as to be capable of oscillating about a fulcrum shaft 407 (which, in this example, also serves as the shaft of one roller of the transport roller pair 402), and is pressurized downwards by an urging member 408. Due to this arrangement, when the original treatment apparatus is closed, the oscillation arm 406 abuts against the platen glass plate 404 and follows the reading position 401 through equalization.

If at this time the platen roller 405 were brought into contact with the platen glass plate 404, it would be constantly rubbed against the platen glass plate 404, thereby damaging the glass. In view of this, the outer diameter of the oscillation arm 406 is larger than the outer diameter of the platen roller 405, forming a gap X between the platen glass plate 404 and the platen roller 405.

By minimizing this gap X, rising of the original during transport is prevented so as to effect image reading at an appropriate level of brightness. At this time, the platen roller 405 is being driven, so that it is possible to transport the original without imparting any load thereto. In particular, in the case in which a contact image sensor is used for the exposure device 409, the reading depth is small, so that in many cases the platen roller 405 used is one capable of easily minimizing the gap X.

The conventional original treatment apparatus performing flow reading using a platen roller has the following problem: In order to stabilize the light quantity on the exposure device during reading to prevent show-through, and to effect contrast enhancement on the characters and background when exposure is effected for the original likely to be see-through as in the case of a thin sheet or an intermediate paper, a white member facing the back surface of the original is provided in the portion of the image reading apparatus on the side opposed to the reading position. In this regard, the original treatment apparatus using a platen roller is no exception, and is normally equipped with a white platen roller opposed to the reading position.

In the construction using a platen roller, due to the curvature of the platen roller, if the reading position is deviated from the position directly below the platen roller, the distance between it and the roller increases, resulting in an insufficient light quantity. This can also cause the shadow of the gap between the platen roller and a guide in the vicinity thereof to be reflected, with the result that the whiteness of the background deteriorates, with the background being read rather dark.

An attempt to perform reading in a place free from such problems would lead to a restriction in the range in which reading is possible in the case of an original treatment apparatus using a platen roller. Similarly, when a contact image sensor (CIS), whose reading depth is less than that of a CCD, is used, the influence of the curvature of the platen roller will be still greater, which means the range in which reading is possible is restricted to the portion in the vicinity of the position directly below the roller.

In view of this, the reading position has conventionally been adjusted to a position in which appropriate reading is possible through positional adjustment of the platen roller and the exposure device by using a jig, detection means, and the like.

It might be possible to widen the reading area by making the curvature gentler by making the diameter of the white roller as large as possible. However, given the component variation of the original treatment apparatus and of the exposure device, it would be necessary to use a white platen roller with a considerably large diameter, resulting in an increase in apparatus size and an increase in cost.

DISCLOSURE OF THE INVENTION

The present invention has been made with a view toward solving the above problems. It is therefore an object of the present invention to provide an image reading apparatus capable of performing stable image reading involving little variation in image brightness even if there is a variation in the reading position, and an image forming apparatus having such an image reading apparatus.

Another object of the present invention is to enlarge the range in which the exposure device can reliably perform reading without involving an increase in the diameter of the white roller.

In order to attain the above-mentioned object, according to an exemplary structure of the present invention, in an image reading apparatus which is equipped with an original transport means for transporting an original in the form of a sheet, and is capable of reading the original while transporting it, the image reading apparatus includes: a transparent member for supporting the original in an image reading position; a reading means arranged in a position opposed to the transparent member and adapted to apply light from an illuminating means to the original on the transparent member to read an image of the original; and a rotatable rotary member opposed to the transparent member and disposed in a position on the side opposite to the illuminating means and the reading means. Also, a reflection member is provided in the vicinity of the rotary member, for reflecting light emitted from the illuminating means when reading the original while transporting it.

Further, in order to attain the above-mentioned object, according to an exemplary structure of the present invention, a sheet transport apparatus includes: a supply means for successively supplying a plurality of sheets to a predetermined reading position; a platen glass plate provided in the predetermined reading position; a platen roller opposed to the platen glass plate; a reading means opposed to the platen glass plate on the side opposite to the platen roller and adapted to perform exposure on a sheet on the platen glass plate to read an image on the sheet; and a white guide member opposed to the platen glass plate on the upstream side of the platen roller in the transporting direction. Also, in the apparatus, the position in which the guide member is closest to the platen roller is on the platen roller side with respect to a plane which includes the point in the outer periphery of the platen roller that is closest to the platen glass plate and which is parallel to the platen glass plate, and the longitudinal length of the guide member is the same as or larger than the width of the range of the reading means which allows reading.

BEST MODE FOR CARRYING OUT THE INVENTION

First Embodiment

Figure 1:
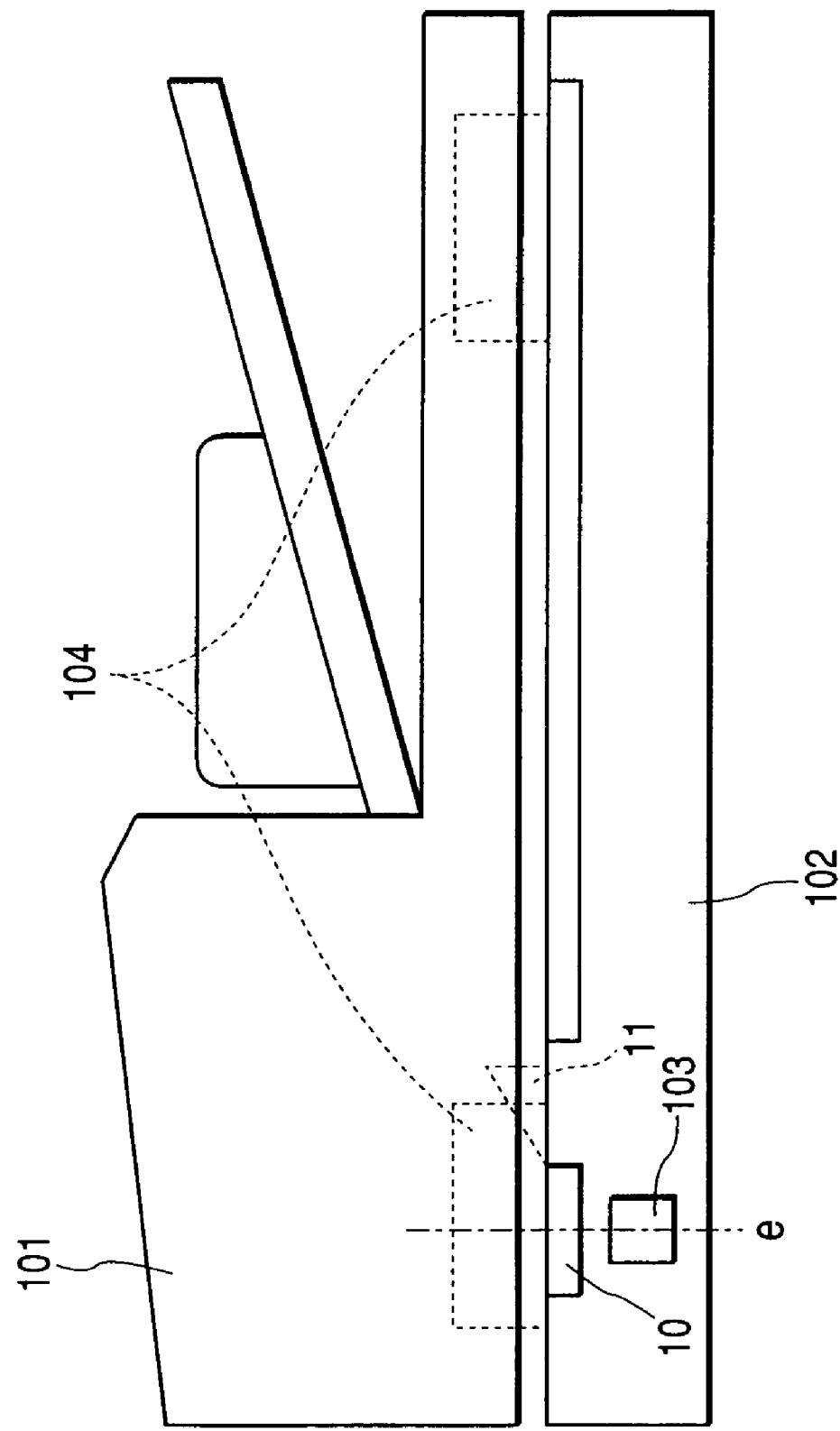
FIG. 1 is a schematic diagram showing an original treatment apparatus and an image reading apparatus.

FIG. 1 is a schematic diagram showing an original treatment apparatus and an image reading apparatus. In this example, the original treatment apparatus, which is an example of a sheet transport apparatus, is one using the flow reading system. An original treatment apparatus 101 is provided on the top of an image reading apparatus 102 through the hinge portions 104. It transports the originals of an original stack on an original tray one by one to a reading position "e" of the image reading apparatus 102.

The image reading apparatus 102 has a platen glass plate 10, a jump stand 11, and an exposure device 103 serving as the reading means. During original transport, the exposure device 103 is fixed in the reading position "e", and performs flow reading on the image of an original being transported at a predetermined speed.

Figure 2:
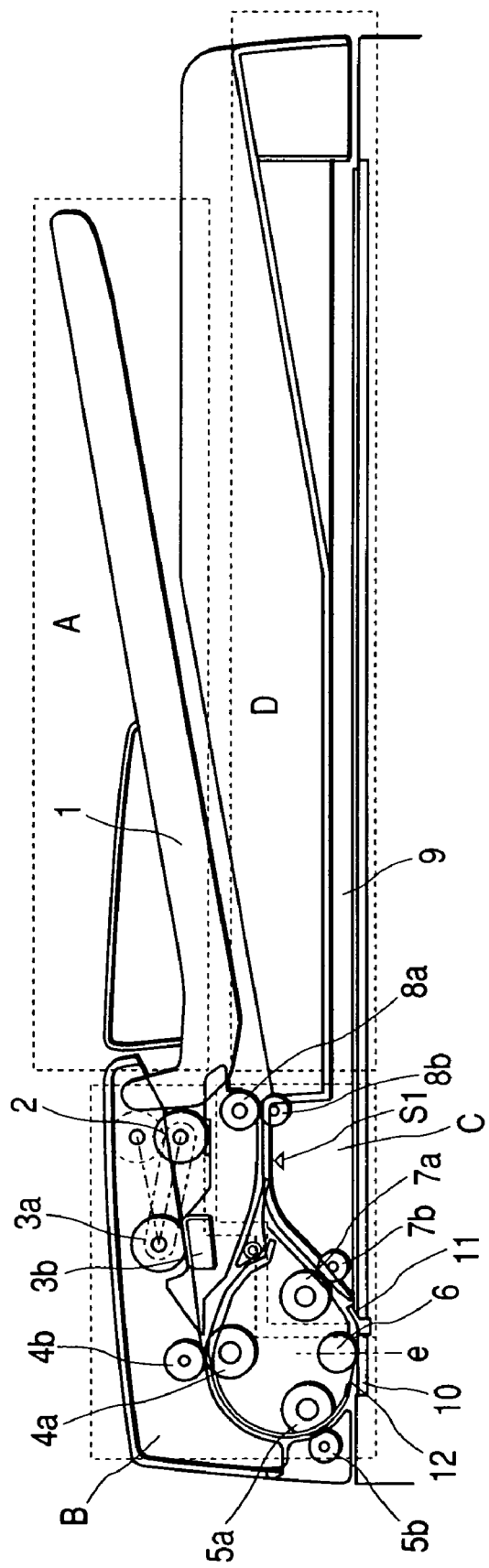
FIG. 2 is a sectional view of the original treatment apparatus.

Next, how a one-side original is transported will be described with reference to FIG. 2, which is a sectional view of the original treatment apparatus 101 of this embodiment.

An original stacking portion A consists of a feed tray 1, on the surface of which originals are stacked.

An original transporting portion B has a pickup roller 2, which draws the original stack on the feed tray 1 into a separating portion 3 (3a, 3b), and the uppermost sheet of the original stack is separated and transported to registration rollers 4 (4a, 4b) by a feed roller 3a and a frictional separation pad 3b.

The registration rollers 4 (4a, 4b) are at rest when the leading edge of the original reaches them. They form a loop in the original through transport by the feed roller 3a to correct a skew feed of the original, and then transport the original to upstream transporting rollers 5 (5a, 5b) serving as a supply means.

The upstream transporting rollers 5 (5a, 5b) pass the fed original through a gap between a platen roller 6 and the platen glass plate 10 and transports it toward downstream transporting rollers 7 (7a, 7b).

During the series of transporting operations for guiding the original from the upstream transporting rollers 5 (5a, 5b) to the downstream transporting rollers 7 (7a, 7b), the original, which is gripped by the upstream transporting rollers 5 (5a, 5b) and the downstream transporting rollers 7 (7a, 7b), is transported on the reading position "e" at a predetermined speed, and exposure operation is performed by the exposure device 103 fixed in position below the reading position "e" on the platen glass plate 10, the image being read by the image reading apparatus 102.

The original delivered from the downstream transporting rollers 7 (7a, 7b) is guided to delivery rollers 8 (8a, 8b) of an original delivery portion C. While exposure operation is being performed in the reading position "e", the delivery rollers 8 (8a, 8b) are separated from each other and perform no transporting operation in the original delivery portion C. After the trailing edge of the original has passed the reading position "e" to complete the reading, the delivery roller 8b moves upwards, and the original is nipped by the delivery roller 8a and the delivery roller 8b and delivered with face down onto a delivery tray 9 of a delivery stacking portion D.

Next, a method of transporting a two-side original according to this embodiment will be described. First, the originals stacked on the original stacking portion A are transported one by one to the reading position "e" on the platen glass plate 10 by the original transporting portion B.

As in the case of the transporting of the one-side original, the original passing on the reading position "e" is gripped by the upstream transporting rollers 5 (5a, 5b) and the downstream transporting rollers 7 (7a, 7b), and transported between the platen glass plate 10 and the platen roller 6 at a predetermined speed. At this time, as in the case of a one-side original, the exposure device 103 is fixed in position below the reading position "e" and records the image of the first side in the image reading apparatus.

In the original delivery portion C, the delivery rollers 8 (8a, 8b) are reversed after the trailing edge of the original has passed the delivery sensor S1, and the original is switched back and transported to the registration rollers 4 (4a, 4b) of the original transporting portion B situated on the side opposite to the delivery direction.

The registration rollers 4 (4a, 4b) transports the original to the reading position "e" on the platen glass plate 10 again, and as in the case of the first side, the original is transported at a predetermined speed by the upstream transport rollers 5 (5a, 5b) and the downstream transport rollers 7 (7a, 7b) to perform exposure operation on the second side before guiding the original to the original delivery portion C.

In the original delivery portion C, due to the construction of the original treatment apparatus 101 of this embodiment, if the original is delivered as it is after the reading of the second side, the delivered original is stacked with face up, resulting in the order of originals going wrong. Thus, it is necessary to reverse the original again in order to correct the order of originals. In view of this, in the original delivery portion C, after the trailing edge of the original has passed the delivery sensor S1, the delivery rollers 8 (8a, 8b) are reversed to transport the original in the direction of the registration rollers 4 (4a, 4b) again, reversing the original to deliver it with face down onto the delivery tray 9 of the delivery stacking portion D.

Figure 3:
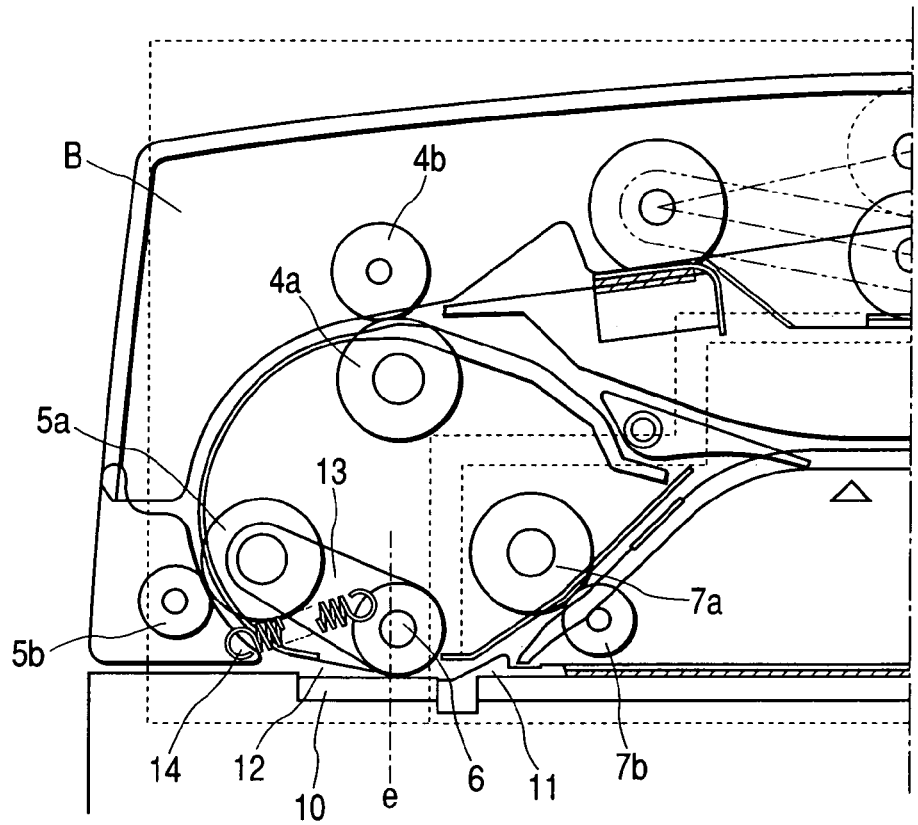
FIG. 3 is a sectional view showing a portion around a reading position.

Next, FIG. 3 is a sectional view of the portion around the reading position of the image reading apparatus of this embodiment. With reference to FIG. 3, the construction of the platen roller 6 of this embodiment will be described. In the reading portion of the original treatment apparatus 101 of this embodiment, the upstream transport rollers 5 (5a, 5b) are provided on the upstream side of the reading position "e", and the downstream side transport rollers 7 (7a, 7b) are provided on the downstream side of the reading position "e". The platen roller 6 is provided substantially above the reading position "e" and supported at its both ends by a pair of oscillation arms 13 so as to be rotatable by a driving means (not shown).

The exposure device 103 is at rest at a position directly below the reading position in which reading is performed on the original transported. Further, the oscillation arms 13 are attached to a shaft of one of the upstream transport rollers 5 (5a, 5b), and can be oscillated using the shaft as the oscillation fulcrum. Further, the oscillation arms 13 receive a downward force of an urging member 14. In the condition in which the original treatment apparatus 101 is open, the oscillation arms 13 are equalized using the oscillation fulcrum as the oscillation center, with the platen roller 6 being substantially pressed down. In the condition in which the original treatment apparatus 101 is closed, the oscillation arms 13 follow the platen glass plate 10 and are equalized while receiving a force directly substantially downward, with the platen roller 6 being situated substantially above the reading position "e".

Further, the outer diameter of the oscillation arms 13 is somewhat larger than that of the platen roller 6, and the oscillation arms 13 are in contact with the platen glass plate 10, thereby forming a minute gap between the platen roller 6 and the platen glass plate 10.

Due to the formation of this minute gap, the platen glass plate 10 is not damaged if the platen roller 6 rotates when there is no sheet. Further, it is advantageously possible to transport the original at an appropriate reading depth for the exposure device 103 without imparting load to the original.

Figure 4:
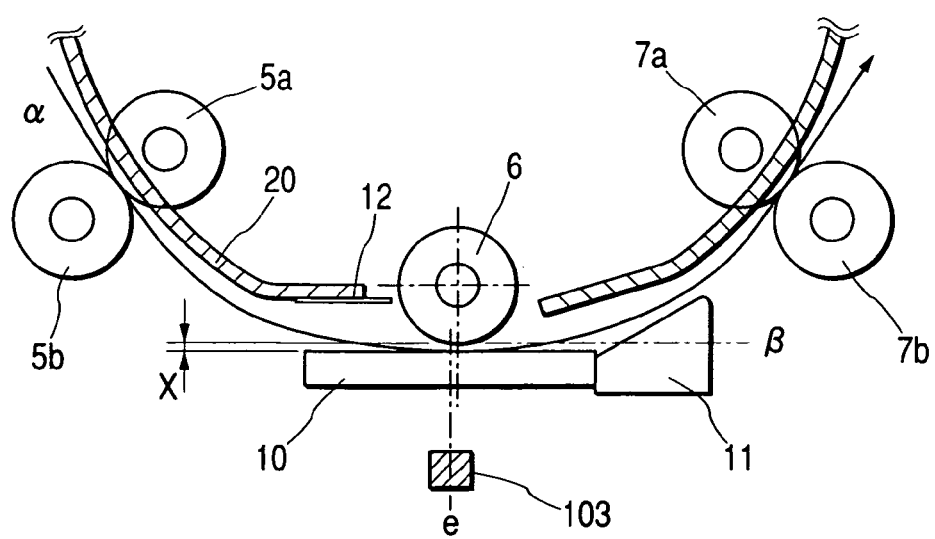
FIG. 4 is a diagram showing the positional relationship between a white guide member and a platen roller.
Figure 5:
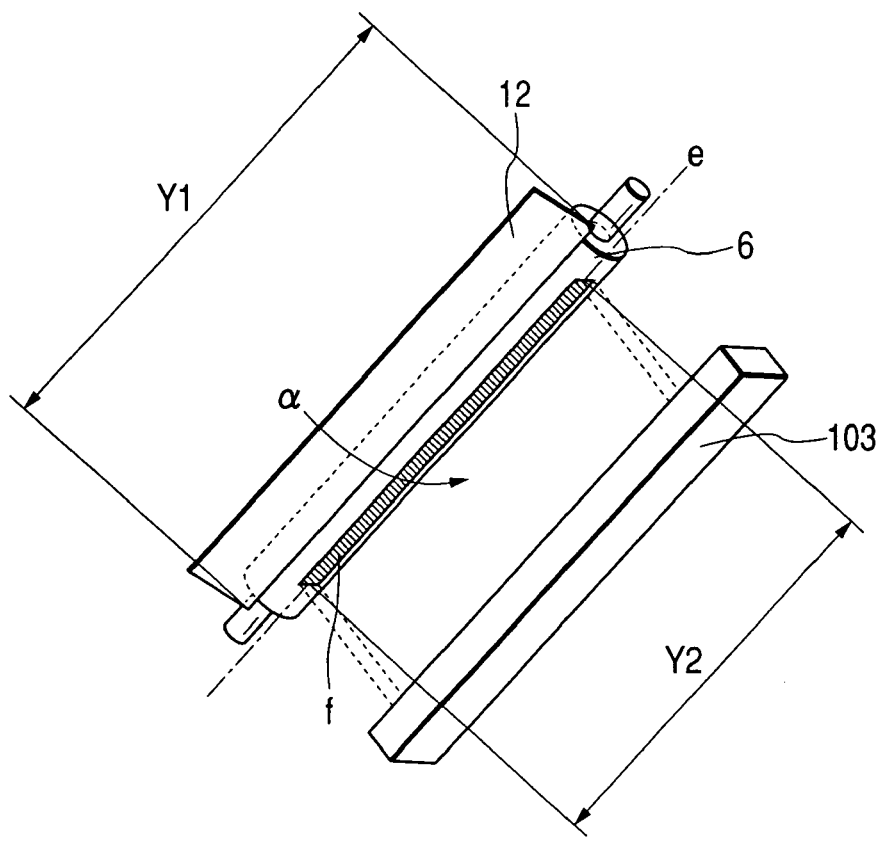
FIG. 5 is a diagram showing the positional relationship between the white guide member and the platen roller.

Next, FIGS. 4 and 5 show the positional relationship between a white guide member and the platen roller in this embodiment. With reference to FIGS. 4 and 5, the construction of the guide member will be described. The guide member 12 is formed of a flexible white film consisting of a polyester film or the like, and has a flat configuration as shown in FIG. 5.

FIG. 4 shows how the guide member 12 is positioned with respect to the transporting direction. The guide member 12 is fixed to the distal end of a transport guide 20 formed of resin or metal. The distal end of the guide member 12 is left free. However, as stated above, the platen roller 6 is designed so as to be equalized, so that in this state the original treatment apparatus 101 is closed with respect to the image reading apparatus 102, with the platen roller 6 following the platen glass plate 10 to be arranged at a predetermined position. In the following description, the platen roller 6 is in this positional relationship.

The positional relationship between the guide member 12 and the platen roller 6 is as follows: The position of the guide member 12 in which it is closest to the platen roller 6 is on the platen roller side with respect to a plane β which is parallel to the platen glass plate and which contains the point in the outer periphery of the platen roller 6 which is closest to the platen glass plate 10.

That is, in this embodiment, the distal end of the guide member 12 in the transporting direction is closest to the platen roller 6, the distal end being above the plane β. This arrangement is adopted for the purpose of preventing the distal end of the guide member 12 from coming into contact with the original during transportation of the original to thereby scrape the image surface of the original and of preventing load from being imparted to the original to thereby generate a blurred image.

Further, as shown in FIG. 5, the width Y1 of the guide member 12 is the same as or larger than the width Y2 of the range "f" of the exposure device 103 allowing image reading, thereby preventing intrusion of external light and reflection of the shadow of a component during image reading.

Due to the above-described construction, even if the reading position is deviated from the position directly below the platen roller 6 as a result of a variation in the original treatment apparatus 101 and the image reading apparatus 102, a variation in the grounding of the platen roller 6, etc., the quantity of light around the platen roller can be large, so that the influence of the shadow generated between the guide and the roller and the influence of the deficiency in light quantity due to roller bending are mitigated, thereby enlarging the range for the exposure device allowing reading.

Further, by using a flexible, thin white film for the guide member, it is possible to fill the gap up to the vicinity of the platen roller, thereby providing a further enhanced effect. Further, the guide member is out of contact of the original, so that it does not rub the image or impart load thereto.

Second Embodiment

Next, the second embodiment of the original treatment apparatus using the flow reading system, which is an example of the sheet transport apparatus of the present invention, will be described with reference to the drawings. The components, which are the same as those of the first embodiment, are indicated by the same reference numerals, and a description thereof will be omitted.

Figure 6:
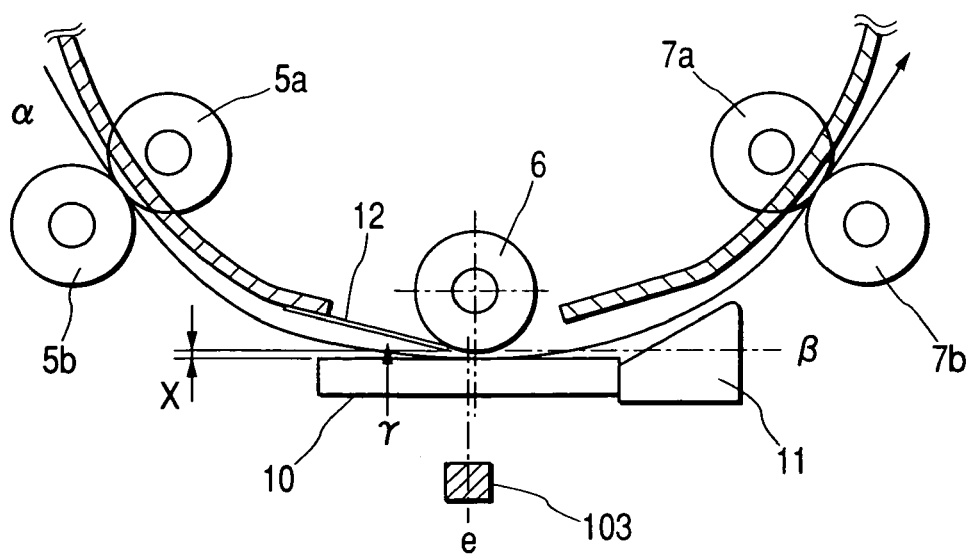
FIG. 6 is a diagram showing the positional relationship between the white guide member and the platen roller.

The guide member 12 is formed of a flexible white film consisting of a polyester film or the like, and has a flat configuration as shown in FIG. 5. FIG. 6 shows how the guide member 12 is situated with respect to the transporting direction. As shown in FIG. 6, one end of the guide member 12 is glued to a transport guide surface on the inner side of the original treatment apparatus 101, and the other end thereof is in contact with the platen roller.

As described with reference to the first embodiment, the platen roller 6 is designed so as to be equalized at this time, so that in the condition shown, the original treatment apparatus 101 is closed with respect to the image reading apparatus 102, and the platen roller 6 follows the platen glass plate 10 to be arranged at a predetermined position. In the following description, the platen roller 6 is in this positional relationship.

The positional relationship between the guide member 12 and the platen roller 6 is as follow: The position in which the guide member 12 abuts against the platen roller 6 is on the platen roller side with respect to a plane β which is parallel to the platen glass plate and which contains the point in the outer periphery of the platen roller 6 which is closest to the platen glass plate 10. That is, in this embodiment, the distal end of the guide member with respect to the transporting direction is closest to the platen roller 6, it is only necessary for the distal end to be above the plane β and in contact with the platen roller.

This arrangement is adopted for the purpose of preventing the distal end of the guide member 12 from coming into contact with the original during transportation to thereby scrape the image surface of the original and of preventing the distal end from imparting load to the image surface during transportation of the original to thereby generate a blurred image.

Further, the guide member 12 is constantly urged in the direction γ by its own resilient force, and even if its position is deviated as a result of a gluing error at the time of gluing, a variation in the platen roller 6, etc., it follows the platen roller 6, so that positional accuracy is easy to achieve, and the relationship between the platen glass plate 10 and the guide member 12 and the abutment relationship between the platen roller 6 and the distal end of the guide member 12 are secured, making it possible to maintain the above-described condition.

Further, as shown in FIG. 5, the width Y1 of the guide member 12 is the same as or larger than the width Y2 of the range "f" of the exposure range 103 allowing image reading, whereby it is possible to prevent intrusion of external light and reflection of the shadow of a component during image reading.

Due to the above-described construction, even if the reading position is deviated from the position directly below the platen roller 6 as a result of a variation in the original treatment apparatus 101 and the image reading apparatus 102, a variation in the grounding of the platen roller, etc., the quantity of light around the platen roller can be large, so that the influence of the shadow generated between the guide and the roller and the influence of the deficiency in light quantity due to roller bending are mitigated, thereby enlarging the range for the exposure device allowing reading.

Further, due to the construction in which the flexible thin white film is constantly in contact with the platen roller and follows the same, the guide member can cover the portion in the vicinity of the position directly below the platen roller without protruding into the transport path, whereby it is possible to further enlarge the range allowing reading as compared with that in the first embodiment.

In particular, in this construction, it is possible to set the reading range so as to cover the guide member including the roller portion, whereby it is possible to secure a wide reading range even if a contact image sensor (CIS) whose reading depth is small is used.

As described above, in accordance with the present invention, the end position in which the white guide member is closest to the platen roller in the condition in which the original treatment apparatus is closed, is on the platen roller side with respect to a plane which is parallel to the platen glass plate 10 and which includes the point in the platen roller outer periphery which is closest to the platen glass plate 10, and the longitudinal length of the guide member is the same as or larger than the length of the range of the exposure device allowing reading, whereby even if the reading position is deviated from the position directly below the platen roller 6, the quantity of light around the platen roller can be large, so that the influence of the shadow generated between the guide and the roller and the influence of the deficiency in light quantity due to roller bending are mitigated, making it possible to enlarge the range for the exposure device allowing reading.

Further, the end portion of the guide member does not protrude into the transport path, so that it does not come into contact with the original to scrape the same or generate a blurred image. Further, in the guide member construction of the second embodiment, the guide member is provided so as to be urged toward the platen roller by its own resilient force, so that even if there is a variation in the position of the platen roller, it always follows the platen roller, whereby positional accuracy can be maintained, and it does not protrude into the transport path or move away from the platen roller, making it possible to cover the portion up to the vicinity of the position directly below the roller.

Due to this arrangement, reading is possible not only on the platen roller but also on the guide member, so that even if an exposure device whose reading depth is small as in the case of a CIS is used, it is possible to secure a sufficiently large reading ranged. Further, due to the wide range allowing reading, there is no need to adjust the reading position. Further, due to the wide range allowing reading, there is no need to use a platen roller with a large diameter, thereby achieving a reduction in apparatus size and cost.

Third Embodiment

While in the above-described embodiments the present invention is applied to a discrete image reading apparatus, this should not be construed restrictively. It is also possible to use the above-described image reading apparatus as the image reading means of an image forming apparatus having an image forming means including an image bearing member and a means acting on the image bearing member.

In the following, the fourth embodiment of the present invention will be described with reference to the drawings.

Fourth Embodiment

Figure 7:
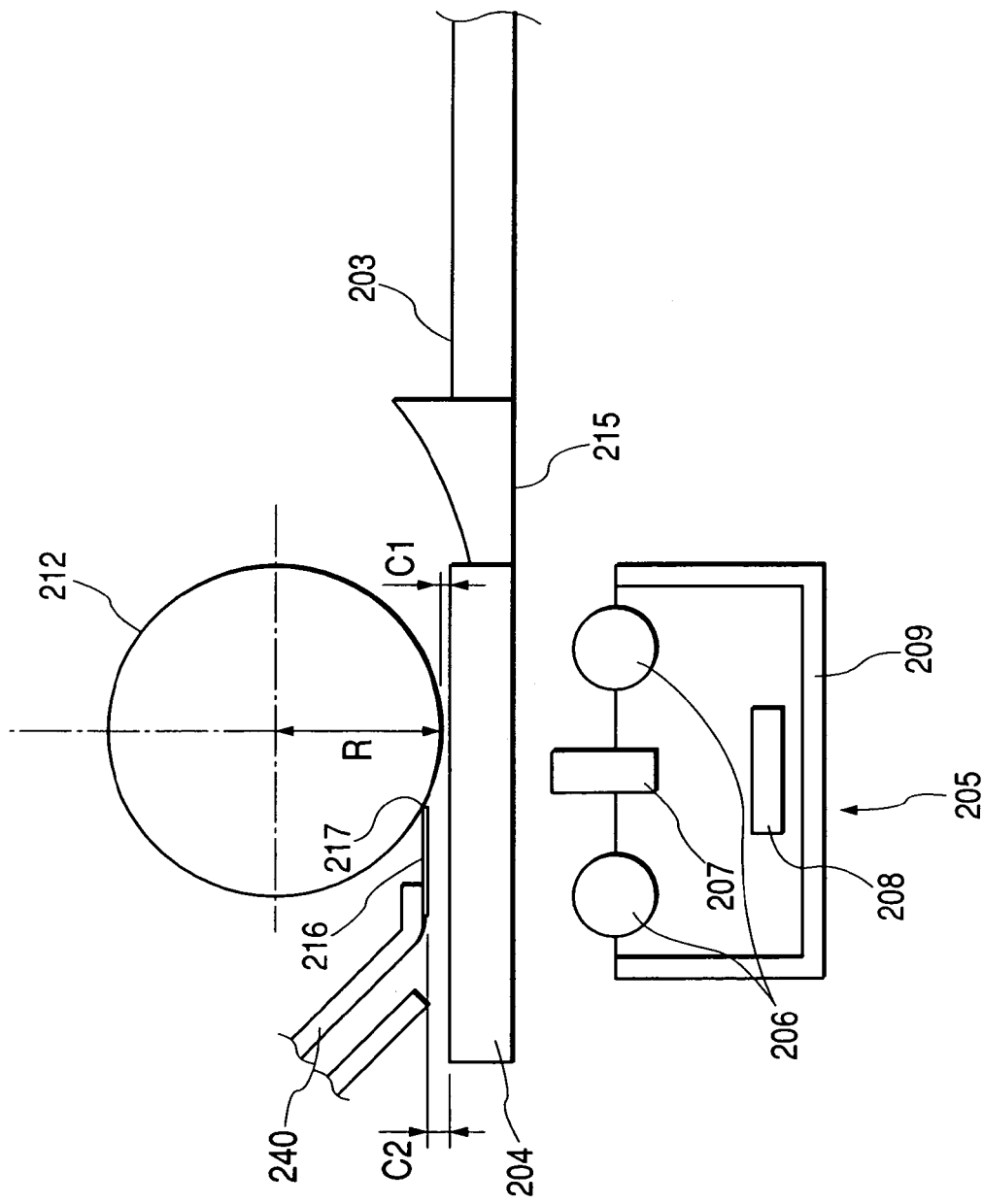
FIG. 7 is a detailed sectional view of a flow reading portion of an image reading apparatus according to a third embodiment of the present invention.
Figure 9:
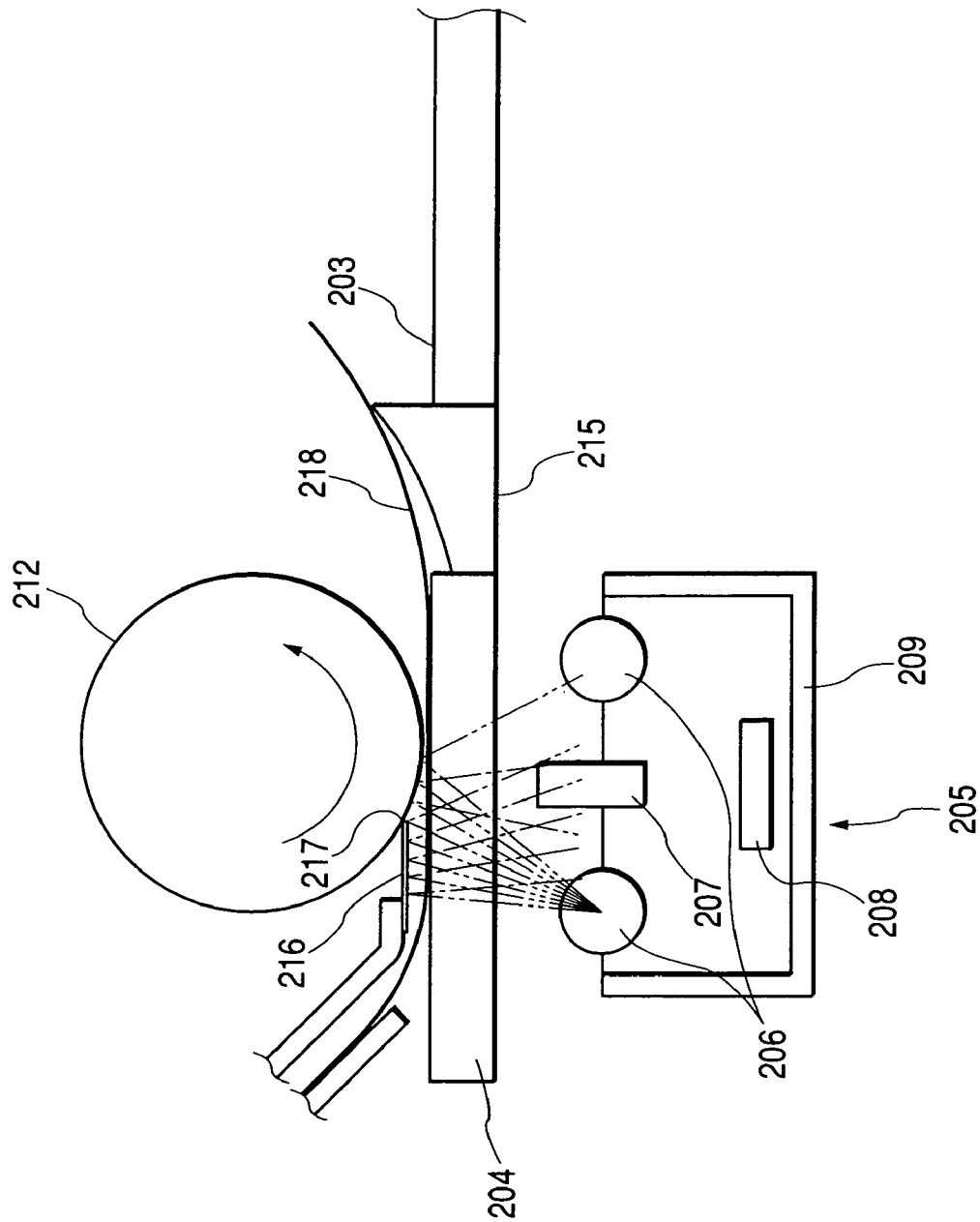
FIG. 9 is a schematic diagram illustrating the brightness variation prevention effect of the image reading apparatus of the third embodiment of the present invention.
Figure 10:
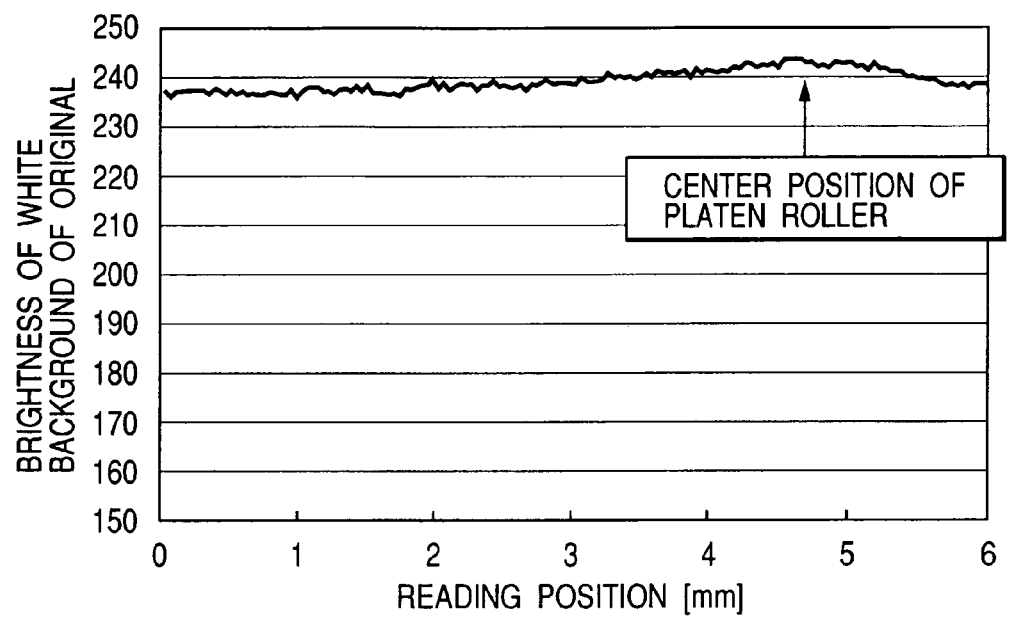
FIG. 10 is a graph showing the relationship between the reading position in flow reading and the brightness of the white background of the original in the image reading apparatus of the third embodiment of the present invention.
Figure 11:
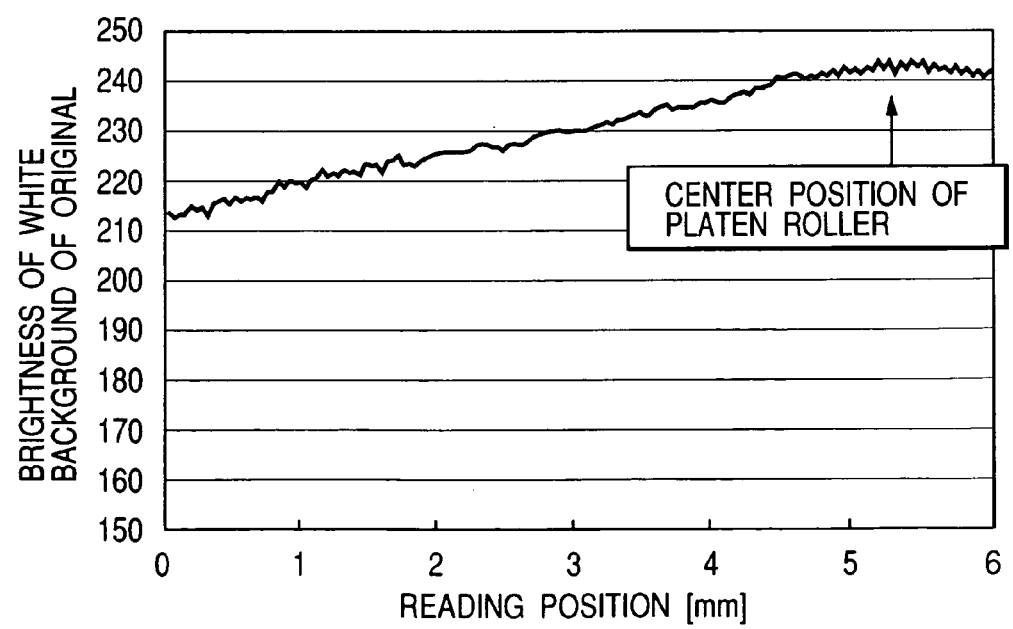
FIG. 11 is a graph showing the relationship between the reading position in flow reading and the brightness of the white background of the original when no white sheet member is provided.

An image reading apparatus according to the fourth embodiment of the present invention will be described with reference to FIGS. 7 through 11. FIG. 7 is a detailed sectional explanatory view of the flow reading portion of the image reading apparatus, FIG. 8 is a general sectional explanatory view of the image reading apparatus, FIG. 9 is a schematic explanatory view showing the brightness variation preventing effect of the reflection member, and FIGS. 10 and 11 are graphs showing the relationship between the reading position in flow reading and the brightness of the white background of the original.

Figure 8:
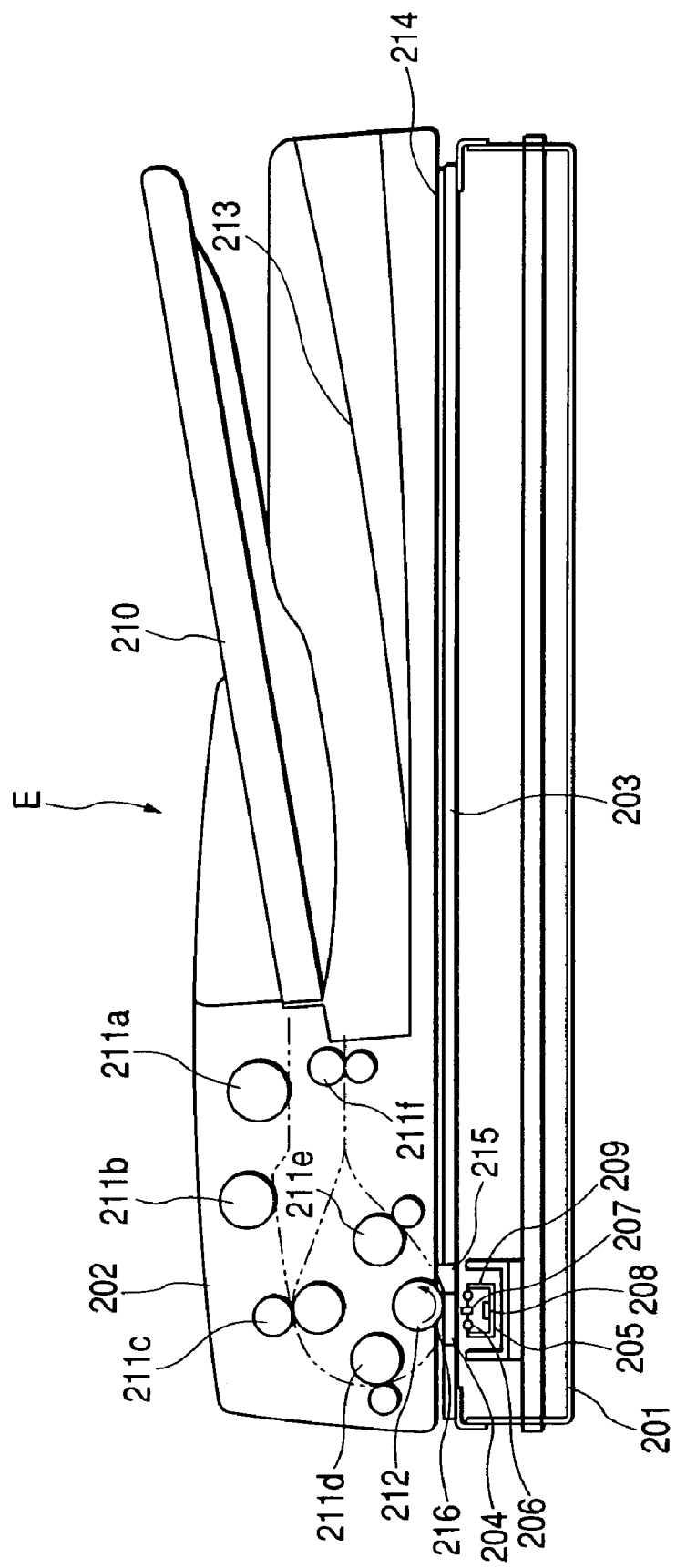
FIG. 8 is a sectional view of the image reading apparatus of the third embodiment of the present invention.

{General Construction of the Image Reading Apparatus} As shown in FIG. 8, the image reading apparatus E of this embodiment includes an image reading portion 201 and an ADF 202, which is an automatic original transport apparatus mounted on top of the image reading portion 201.

The image reading portion 201 is capable of reading originals in both the book reading system and the flow reading system. That is, an original glass stand 203 is provided on the upper surface of the image reading portion 201, and, at one end of the original glass stand 203, there is provided a flow reading glass plate 204 as a transparent member for supporting an original to be read by flow reading.

Further, below the glass plate, there is provided a reading means 205 for reading the image of an original. This reading means 205 includes a casing 209, which integrally contains an illuminating means 206 such as a xenon tube for applying light to the original on the glass plate, a SELFOC lens 207 for imaging the reflected light from the original, and a contact image sensor 208 arranged in the imaging position for the SELFOC lens 207. The casing 209 is caused to abut against the original glass stand 203 or the flow reading glass plate 204 through an abutment member (not shown) with high slidability, and the reading means 205 is spaced apart from the original surface by a predetermined distance.

The ADF 202 is mounted to the upper portion of the image reading portion 201 so as to allow opening and closing by a hinge or the like, and there are provided rollers 211a through 211f adapted to supply originals to the image reading portion 201 and serving as original transport means for transporting one by one the originals in the form of sheets stacked on an original stacking portion 210, a platen roller 212 as a rotary member for preventing the original from rising from the flow reading glass plate 204 during flow reading, and an original delivery portion 213 for delivering the originals which have undergone image reading.

In the case of the book reading system, the original placed on the original glass stand 203 is secured in position by a white pressure plate 214 mounted to the ADF 202, and the original is read while driving the reading means 205 at a predetermined speed in the sub scanning direction (the horizontal direction in FIG. 8). At the time of book reading, the ADF 202 functions as a pressure plate for fixing the original to the original glass stand 203.

In the case of the flow reading system, the original stacked on the original stacking portion 210 of the ADF 202 is fed by the feed roller 211a and transported at a predetermined speed to the position below the platen roller 212 by the transport rollers 211b, 211c, and 211d. The original is restricted in the amount by which it is raised from the upper surface of the flow reading glass plate 204 by the platen roller 212 rotating at a predetermined rotating speed, and the reading means 205 at rest at a predetermined reading position applies light from the illuminating means 206 to the original being transported between the platen roller 212 and the upper surface of the flow reading glass plate 204 to thereby perform image reading. The original having passed the platen roller 212 is guided to the transport rollers 211e and 211f by a jump stand 215 and delivered onto an original delivery portion 213.

{Arrangement for Preventing Brightness Variation during Flow Reading} Next, the arrangement for preventing a variation in brightness during flow reading will be described. As shown in FIG. 7, the ADF 202 of this embodiment is equipped with a white flexible sheet member 216 serving as a reflection member situated on the upstream side of the platen roller 212 in the original transporting direction. This white sheet member 216 is mounted to a guide member 240 for guiding the original to the platen roller 212 so as to be substantially parallel to the flow reading glass plate 204. The distance C2 between the white sheet member 216 and the flow reading glass plate 204 is larger than the distance C1 between the flow reading glass plate 204 and the surface of the platen roller 212 and smaller than the distance (C1+R) between the flow reading glass plate 204 and the rotation center of the platen roller 212 (C1<C2<C1+R).

Further, the end position 217 in which the sheet member 216 is close to the platen roller 212 is determined such that when seen from the reading position for the reading means 205 in the direction of the rotary member (the reading direction), that is, when seen from a position directly below the flow reading glass plate 204 in the direction of the platen roller 212 and the white sheet member 216 situated above, a part of the platen roller 212 is hidden substantially over the entire image reading range in the main scanning direction of the reading means 205 (the longitudinal direction of the platen roller 212). Further, the reading position in the case of the flow reading system is set to a position that allows reading of the surface of the platen roller 212 when no original is being transported.

The brightness reduction preventing effect of the white sheet member 216 of this embodiment can be schematically explained with reference to FIG. 9. FIG. 9 schematically shows the route of light applied from the illuminating means 206 on one side (the left-hand side in this embodiment) and transmitted through the original. The reading position for flow reading is set to a position deviated from the position directly below the rotation center of the platen roller 212 to the upstream side in the original transporting direction.

Figure 16:
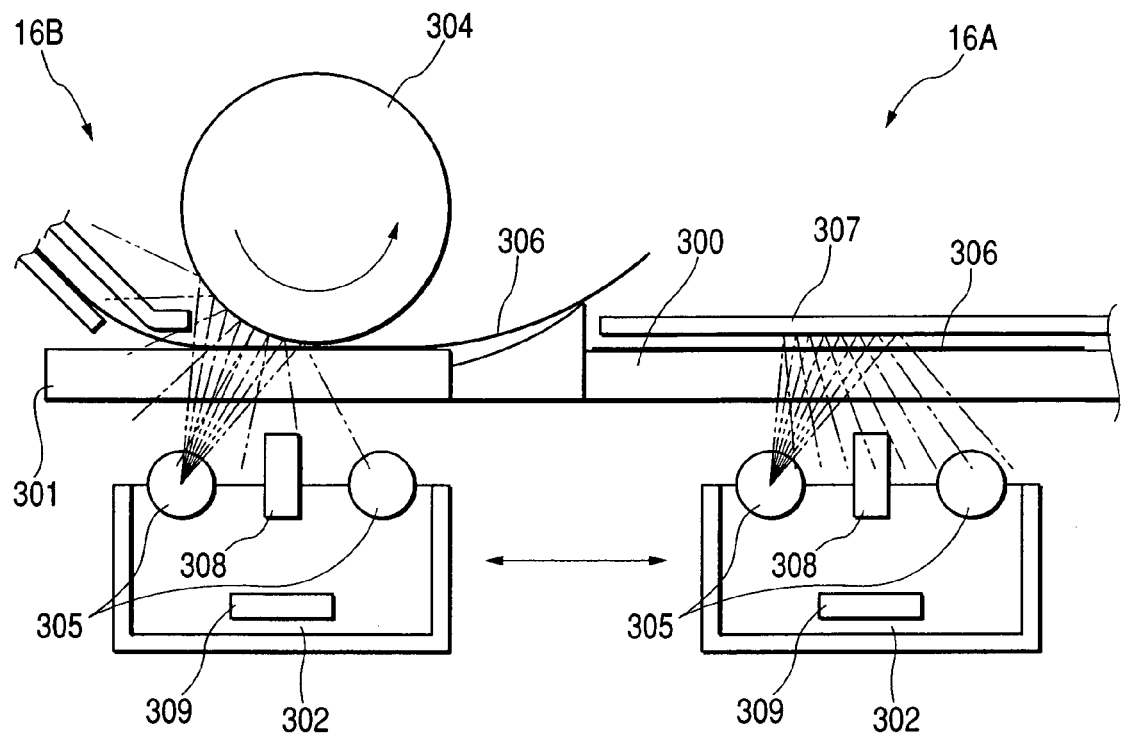
FIG. 16 is a schematic diagram showing how a variation in brightness occurs in a conventional image reading apparatus.
Figure 17:
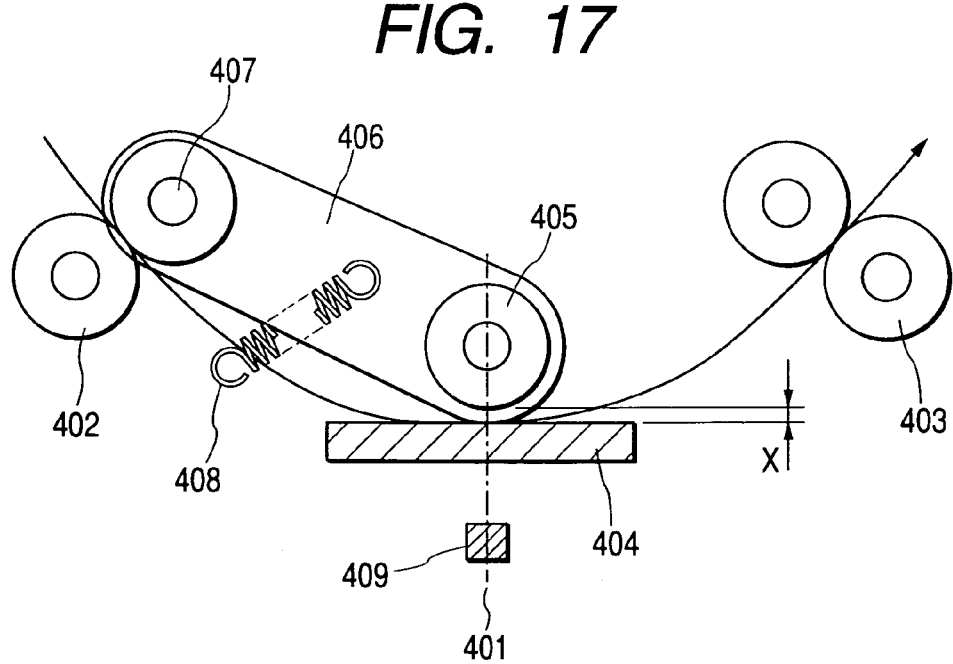
FIG. 17 is a schematic diagram showing the construction of the portion of a conventional original treatment apparatus in the vicinity of the reading position.

The light transmitted through the original 218 is reflected in the direction of the reading means 205 by the white sheet member 216. It can be seen that the quantity of light applied to the back surface of the original 218 is larger than that in the case of the conventional example designated by the reference sign 16B in FIG. 16. Due to this arrangement, the reduction in brightness when the reading position is deviated from the position directly below the center of the platen roller 212 can be mitigated.

FIGS. 10 and 11 show the results of measurement of the relationship between the reading position in flow reading and the brightness of the white background of the original (0 to 255 level). FIG. 10 shows the measurement result of this embodiment, in which the white sheet member 216 is mounted, and FIG. 11 shows the measurement result of the case in which no white sheet member 216 is mounted.

As shown in FIG. 11, when no white sheet member 216 is provided, the brightness of the white background of the original is greatly reduced as the reading position is deviated from the position directly below the rotation center of the platen roller 212. In contrast, as shown in FIG. 10, when the white sheet member 216 is provided as in this embodiment, the reduction in brightness is slight, and even if there is a variation in the reading position, the variation in brightness can be restrained to a level substantially involving no problem.

Due to the arrangement in which the distance C2 between the white sheet member 216 and the flow reading glass plate 204 is larger than the distance C1 between the flow reading glass plate 204 and the surface of the platen roller 212 and smaller than the distance (C1+R) between the flow reading glass plate 204 and the rotation center of the platen roller 212, the white sheet member 216 does not come into contact with the original 218 regulated by the platen roller 212, and reflects the light from the illuminating means 206 without hindering the transport of the original 218 or rubbing the original surface to generate dust.

Further, in this embodiment, when seen upwardly (in the direction of the platen roller 212) from the reading position for the reading means 205, the white sheet member 216 hides a part of the platen roller 212 over the entire reading range, so that the light applied from the reading position by the illuminating means 206 and transmitted through the original is reliably reflected by the white sheet member 216 or the platen roller 212. Thus, no deterioration in brightness occurs.

Further, since the white sheet member 216 is mounted so as to be parallel to the flow reading glass plate 204, the light transmitted through the original is reflected in the same manner as in the case in which it is reflected by the white pressure plate 214 in book reading, and there is no substantial difference in brightness between book reading and flow reading.

Further, the reading position for flow reading is set to a position between the position directly below the rotation center of the platen roller 212 and the distal end 217 of the white sheet member 216. That is, when no original is being transported, it is set to a position in which the surface of the platen roller 212 is read, so that it is possible to distinguish between the dust on the flow reading glass plate 204 and the dust on the platen roller 212 when performing detection, whereby it is possible to perform high quality image reading involving no streaked image. Further, by setting the reading position on the upstream side of the rotation center of the platen roller 212 with respect to the original transporting direction, it is possible to make the platen roller 212 less subject to adhesion of dust.

Fifth Embodiment

Figure 12:
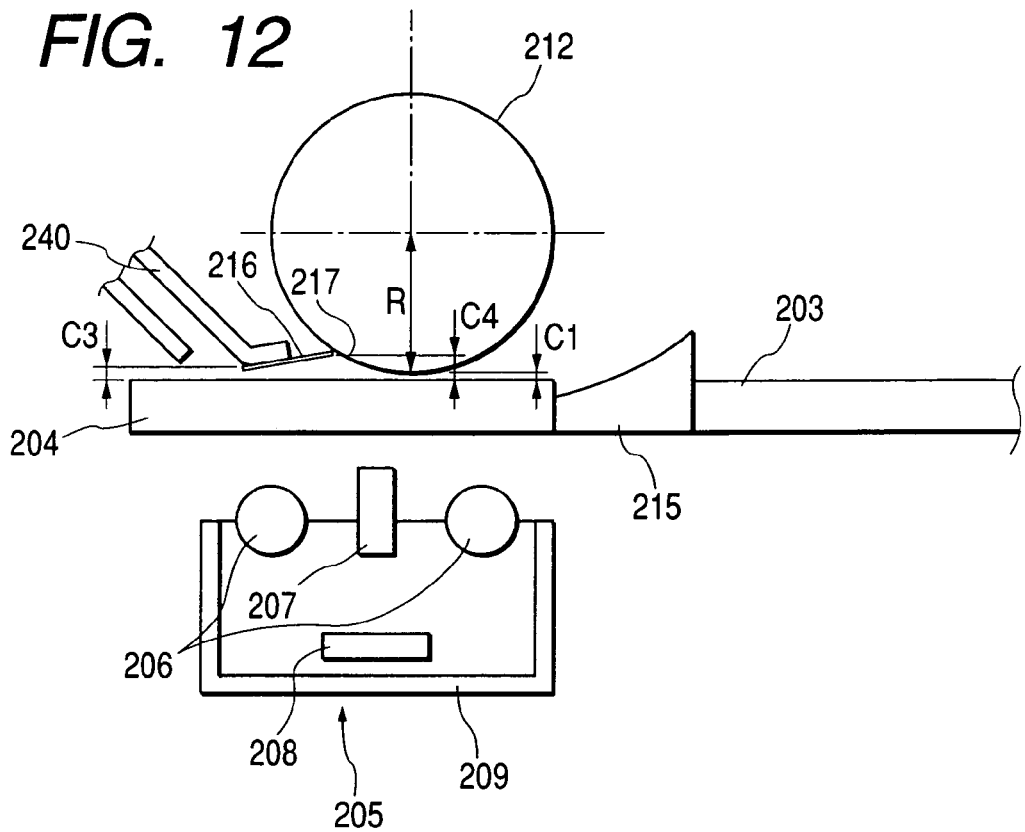
FIG. 12 is a detailed sectional view of a flow reading portion of an image reading apparatus according to a fourth embodiment of the present invention.
Figure 13:
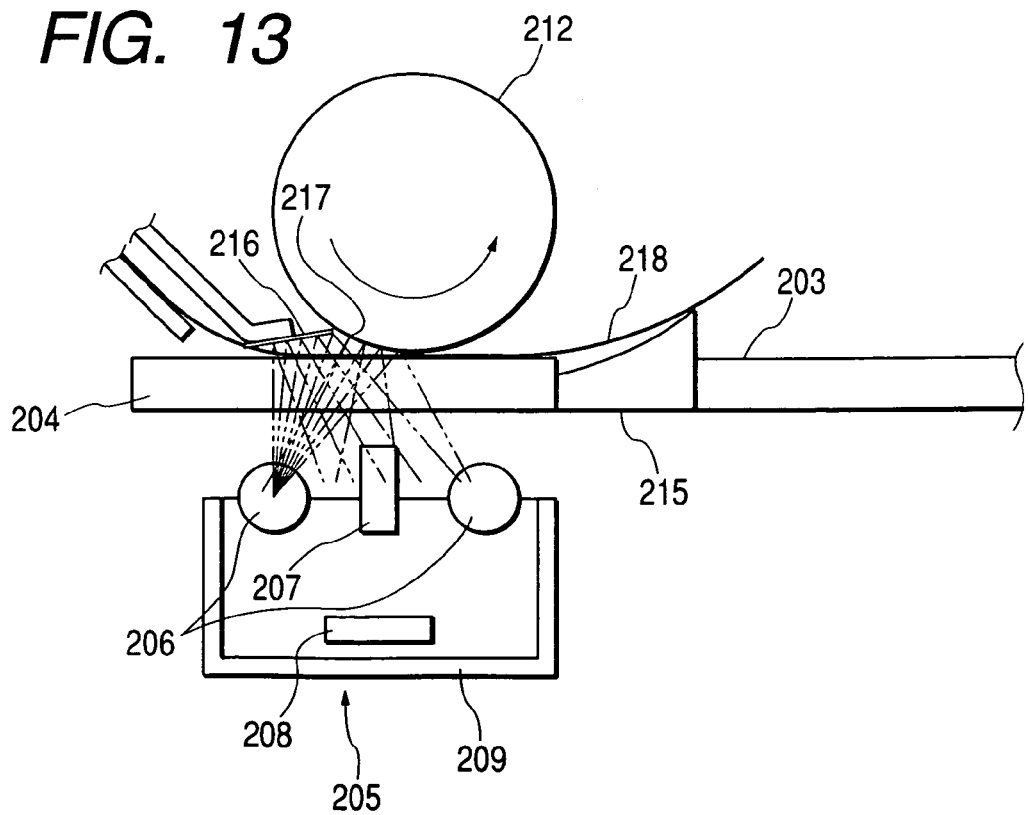
FIG. 13 is a schematic diagram illustrating the brightness variation prevention effect of the image reading apparatus according to the fourth embodiment of the present invention.

Next, the fifth embodiment of the image reading apparatus of the present invention will be described with reference to FIGS. 12 and 13. FIG. 12 is a detailed sectional explanatory view of the flow reading portion, and FIG. 13 is a schematic explanatory view illustrating the brightness variation preventing effect.

This embodiment differs from the fourth embodiment in that while in the fourth embodiment the white sheet member 216 is mounted so as to be parallel to the flow reading glass plate 204, the white sheet member 216 of this embodiment is arranged such that the distance between the white sheet member 216 and the flow reading glass plate 204 increases as the white sheet member 216 approaches the platen roller 212. Regarding the other structures, this embodiment is of the same construction as the first embodiment.

That is, as shown in FIG. 12, the white sheet member 216 is mounted obliquely so that the distance between the white sheet member 216 and the flow reading glass plate 204 may be such that the distance C4 at the downstream end in the original transporting direction is larger than the distance C3 at the upstream end. Then, the minimum distance C3 between the white sheet member 216 and the flow reading glass plate 204 is larger than the distance C1 between the flow reading glass plate 204 and the surface of the platen roller 212, and the maximum distance C4 between the white sheet member 216 and the flow reading glass plate 204 is smaller than the distance (C1+R) between the flow reading glass plate 204 and the center of the platen roller 212.

The brightness reduction preventing effect of the white sheet member 216 of this embodiment can be schematically illustrated with reference to FIG. 13. FIG. 13 schematically shows the route of light emitted from the illuminating means 206 on one side and transmitted through the original.

The light transmitted through the original 218 is reflected in the direction of the reading means 205 by the white sheet member 216. The white sheet member of this embodiment is inclined with respect to the flow reading glass plate 204, so that it has the effect of condensing the light transmitted through the original 218 in the direction of the reading means 205. Thus, it can be seen that as compared with the case of the flow reading portion of the first embodiment shown in FIG. 9, more light is thrown from the back side of the original 218. Due to this arrangement, the reduction in brightness when the reading position is deviated from the rotation center of the platen roller 212 is further mitigated, and even if there is a variation in the reading position, it is possible to perform a stable image reading involving little variation in brightness.

If, in addition to inclining the white sheet member 216, the white sheet member 216 is formed in a concave configuration with respect to the illuminating means 206, the light from the illuminating means 206 is condensed at the reading means 205 more effectively.

Sixth Embodiment

Figure 14:
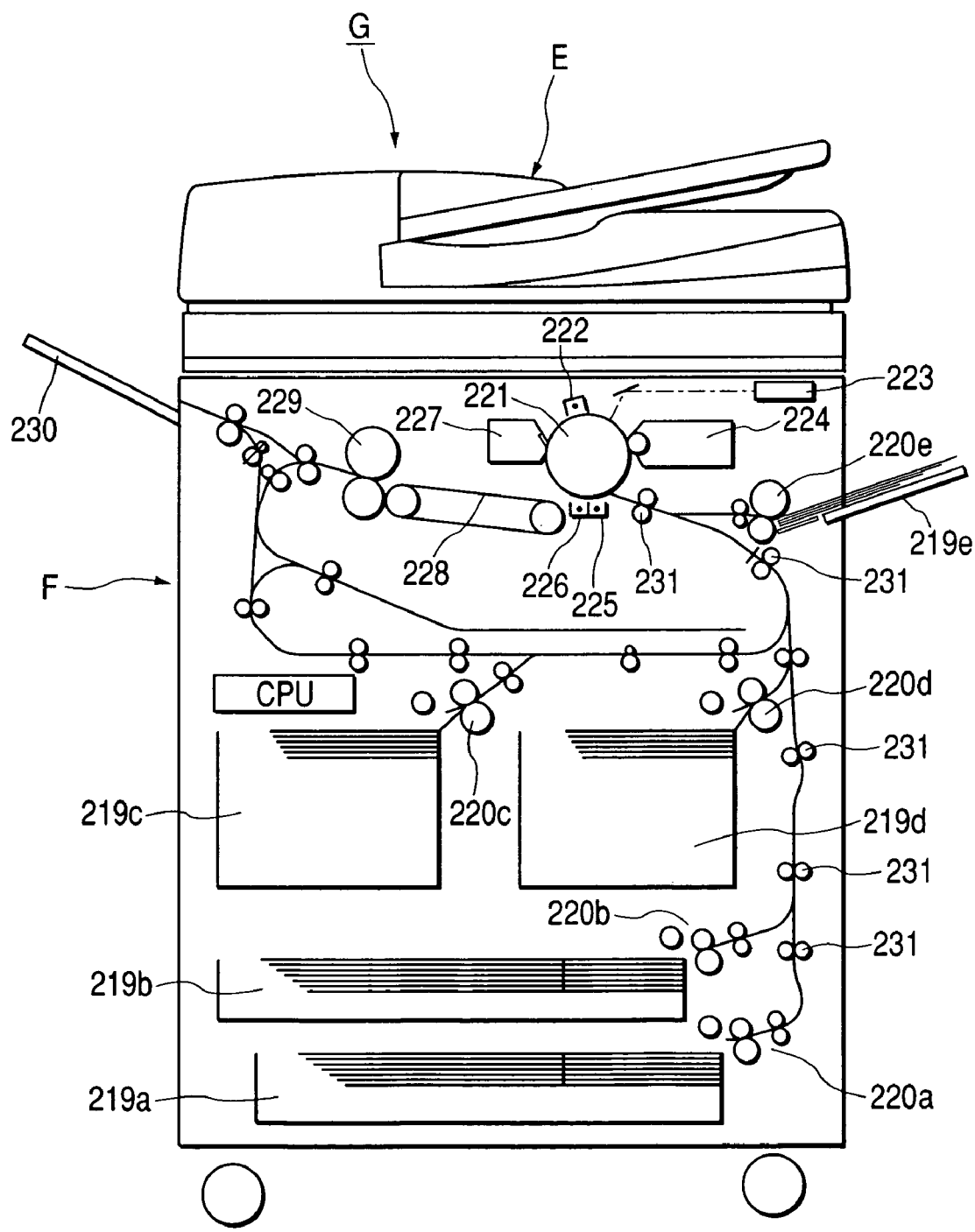
FIG. 14 is a sectional view of an image forming apparatus according to a fifth embodiment of the present invention.
Figure 15:
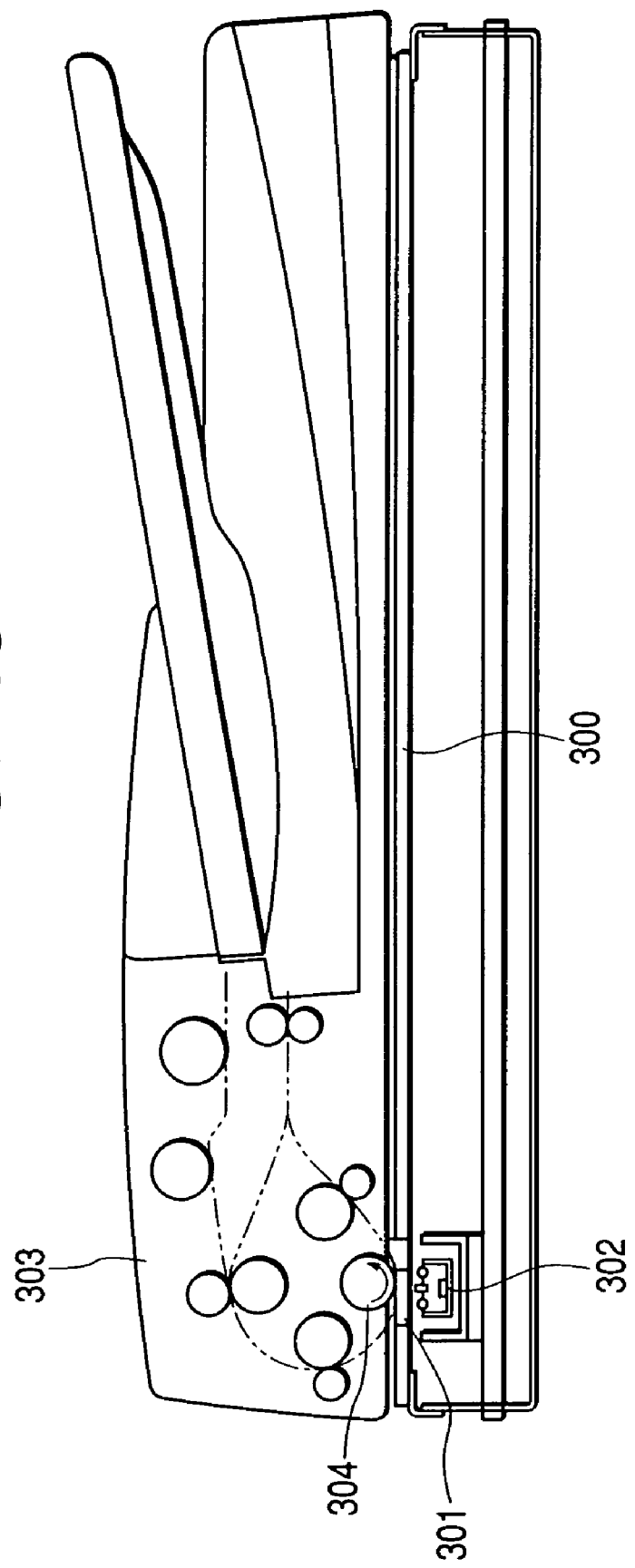
FIG. 15 is a sectional view of a conventional image reading apparatus.

While the above-described embodiments are applied to an image reading apparatus, the present invention is also applicable to an image forming apparatus G such as a copying machine in which, as shown in FIG. 14, an image reading apparatus E and an image recording apparatus F are integrated.

FIG. 14 is a general schematic explanatory view of an image forming apparatus. The construction of the image reading apparatus E is the same as that described with reference to the fourth embodiment. The image recording apparatus F performs image recording on the basis of image data read by the image reading apparatus E or image data read by some other image reading apparatus and transmitted.

Specifically, when an image recording signal is input, the recording media set in a selected one of sheet accommodating portions 219a, 219b, 219c, and 219d, and a tray 219e is transported to an image forming means for image formation by driving a selected one of feeding portions 220a, 220b, 220c, 220d, and 220e and a transport roller 231.

The image forming means comprises a photosensitive drum 221, a charger 222 for uniformly charging the surface of the photosensitive drum 221, an exposure means 223 for selectively performing exposure on the surface of the photosensitive drum 221 charged by the charger 222 according to image information, a developing device 224 for developing an electrostatic latent image formed on the photosensitive drum 221 through exposure by the exposure means 223 and forming a toner image to be transferred to the recording medium transported, a transfer charger 225 for transferring the developed toner image on the surface of the photosensitive drum 221 to the recording medium, a separation charger 226 for separating the recording medium to which the toner image has been transferred from the photosensitive drum 221, and a cleaner 227 for removing residual toner on the photosensitive drum 221 after the transfer of the toner image. The image forming means forms an image on the recording medium by electrophotography.

The recording medium on which an image has been formed is transported to a fixing device 229 by a transport portion 228, and is delivered onto a delivery tray 230 after the toner image has been fixed by heating.

By thus integrating the image reading apparatus E and the image recording apparatus F to form the image forming apparatus G, the variation in brightness during flow reading of the original is effectively prevented, as in the above-described embodiments, making it possible to perform a stable image reading and to realize a high-quality and high-speed image formation based thereon.

OTHER EMBODIMENTS

While in the above-described embodiments a contact image sensor is used for the image reading means, it is also possible to use a folded mirror and a CCD, or guide the reflected light from the original to the surface of the photosensitive member of an image forming apparatus by a folded mirror for direct exposure.

In the above-described embodiments, in order to avoid the influence of the dust on the flow reading glass plate 204, the reading position is set to be on the upstream side of the position directly below the rotation center of the platen roller 212 in the original transporting direction, and the white sheet member 216 is provided on the upstream side. It is to be noted, however, that the adhesion of dust to the flow reading glass plate 204 is also varied by the configuration of the original transport path, etc. In view of this, it is also possible to set the reading position to be on the downstream side of the position directly below the rotation center of the platen roller 212 in the original transporting direction, and to accordingly provide the white sheet member 216 which is reflection member on the downstream side, or to set the flow reading position to be on each side of the position directly below the rotation center of the platen roller 212, providing the white sheet member 216 on each of the upstream and the downstream sides in the original transporting direction.

Further, while in the above-described embodiments a white sheet member easily reflecting light is used as the reflection member, this should not be construed restrictively. The reflection member may be of any other type as long as it is capable of effectively reflecting the light from the illuminating means 206.

As described above, in accordance with the present invention, there are provided a supply means for successively supplying a plurality of sheets to a predetermined reading position, a platen glass plate provided in the predetermined reading position, a platen roller provided so as to be opposed to the platen glass plate, a reading means provided so as to be opposed to the platen glass plate on the side opposite to the platen roller and adapted to perform exposure on the sheet on the platen glass plate to read the image on the sheet, and a white guide member provided so as to be opposed to the platen glass plate on the upstream side of the platen roller in the transporting direction, wherein the position in which the guide member is closest to the platen roller is on the platen roller side with respect to a plane which is parallel to the platen glass plate and which includes the point in the outer periphery of the platen roller which is closest to the platen glass plate, and wherein the longitudinal length of the guide member is the same as or larger than the width of the range of the reading means which allows reading, whereby it is possible to enlarge the range in which the exposure device can reliably perform reading without involving an increase in the diameter of the white roller.

As described above, in accordance with the present invention, there is provided a reflection member for reflecting light from the illuminating means when reading the original while transporting the original, so that the light transmitted through the original is reflected in the direction of the image reading means to illuminate the original from the back side. Thus, even if there is a variation in the flow reading position, it is possible to perform a stable image reading involving little variation in the brightness of the image.

What is claimed is:

1. A sheet transport apparatus comprising:
   supply means for successively supplying a plurality of sheets to a predetermined reading position;
   a platen glass plate provided in the predetermined reading position;
   a platen roller opposed to the platen glass plate;
   reading means opposed to the platen glass plate on a side opposite to the platen roller and adapted to perform exposure on a sheet on the platen glass plate to read an image on the sheet; and
   a white guide member opposed to the platen glass plate upstream of the platen roller in a transport direction,
   wherein a distance between the guide member and the platen glass plate is longer than a distance between the platen glass plate and a surface of the platen roller,
   wherein the guide member is provided in a position upstream of the platen roller in the transport direction, in which position the guide member is not in contact with the sheet when the reading means reads the image on the sheet, and
   wherein the predetermined reading position is provided upstream of a rotation center of the platen roller in the transport direction and downstream of the guide member in the transport direction.

2. A sheet transport apparatus according to claim 1, wherein a distal end of the guide member is in contact with the platen roller in a position on the platen roller side with respect to the plane which includes the point in the outer periphery of the platen roller that is closest to the platen glass plate and which is parallel to the platen glass plate.

3. A sheet transport apparatus according to claim 1, wherein the guide member comprises a white elastic member having flexibility.

4. An image reading apparatus comprising:
   an original treatment apparatus for feeding a sheet; and
   sheet transport means for transporting the sheet at a time of image reading to read an image on the sheet,
   wherein the sheet transport means is a sheet transport apparatus as claimed in claim 1.

5. An image reading apparatus, which is provided with original transport means for transporting an original in a form of a sheet and reads the original while transporting the original,
   the apparatus comprising:
   a transparent member for supporting the original in an image reading position;
   reading means arranged in a position opposed to the transparent member and adapted to apply light from illuminating means to the original on the transparent member to read an image of the original;
   a rotatable rotary member opposed to the transparent member and disposed in a position on a side opposite to the illuminating means and the reading means; and
   a reflection member for reflecting light applied from the illuminating means when reading the original while transporting the original,
   wherein a distance between the reflection member and the transparent member is longer than a distance between the transparent member and a surface of the rotary member, and wherein the reading position for reading the original while transporting the original is set to a position in which a surface of the rotary member is read when no original is being transported.

6. An image reading apparatus according to claim 5, wherein a distance between the reflection member and the transparent member is shorter than a distance between the transparent member and a rotation center of the rotary member.

7. An image reading apparatus according to claim 5, wherein a distal end of the reflection member that is closest to the rotary member is situated such that when seen in a direction of the rotary member from the reading position for the reading means, the reflection member hides a part of the rotary member in a substantially entire reading range for the reading means.

8. An image reading apparatus according to claim 5, wherein the reflection member is arranged parallel to the transparent member.

9. An image reading apparatus according to claim 5, wherein the reflection member is arranged such that the distance between the reflection member and the transparent member increases as the reflection member approaches the rotary member.

10. An image reading apparatus according to claim 5, wherein the reflection member comprises a white sheet having flexibility.

11. An image reading apparatus according to claim 5, wherein the reading position for reading the original while transporting the original is upstream of a rotation center of the rotary member in an original transport direction.

12. An image forming apparatus, which is provided with original transport means for transporting an original in a form of a sheet and records information read by an image reading apparatus, which reads the original while transporting the original, onto a recording medium, the image forming apparatus comprising:
an image reading apparatus as claimed in claim 5; and
image forming means for recording an image on the recording medium.

* * * * *

UNITED STATES PATENT AND TRADEMARK OFFICE
CERTIFICATE OF CORRECTION

| | |
|---|---|
| PATENT NO. | : 7,385,735 B2 |
| APPLICATION NO. | : 10/494724 |
| DATED | : June 10, 2008 |
| INVENTOR(S) | : Yuichi Makino and Taiya Hirayama |

It is certified that error appears in the above-identified patent and that said Letters Patent is hereby corrected as shown below:

Title Page, Item (75) Inventors, change "Tokyo" to --Ibaraki-- (both instances)

Signed and Sealed this

Twenty-second Day of December, 2009

David J. Kappos
*Director of the United States Patent and Trademark Office*